United States Patent
Geng

(10) Patent No.: US 9,205,924 B2
(45) Date of Patent: Dec. 8, 2015

(54) LIFT ASSIST

(71) Applicant: General Aerospace GmbH, Eschbach (DE)

(72) Inventor: Johannes Geng, Freiburg (DE)

(73) Assignee: Generale Aerospace GmbH, Eschbach (DE)

( * ) Notice: Subject to any disclaimer, the term of this patent is extended or adjusted under 35 U.S.C. 154(b) by 126 days.

(21) Appl. No.: 14/193,571

(22) Filed: Feb. 28, 2014

(65) Prior Publication Data

US 2014/0246968 A1 Sep. 4, 2014

(30) Foreign Application Priority Data

Mar. 1, 2013 (DE) .................. 10 2013 003 364

(51) Int. Cl.
*B64D 11/00* (2006.01)
(52) U.S. Cl.
CPC ........... *B64D 11/003* (2013.01); *E05Y 2201/21* (2013.01)
(58) Field of Classification Search
CPC .................................................. B64D 11/003
USPC ...................................................... 244/118.1
See application file for complete search history.

(56) References Cited

U.S. PATENT DOCUMENTS

| | | | |
|---|---|---|---|
| 7,258,406 B2 | 8/2007 | Stephan et al. | |
| 8,770,515 B1* | 7/2014 | Cloud et al. | 244/118.5 |
| 2002/0175244 A1* | 11/2002 | Burrows et al. | 244/118.1 |
| 2003/0080247 A1* | 5/2003 | Frazier | 244/118.1 |
| 2004/0245897 A1* | 12/2004 | Stephan et al. | 312/246 |
| 2005/0230541 A1* | 10/2005 | Graf et al. | 244/118.5 |
| 2008/0035794 A1* | 2/2008 | Steinbeck et al. | 244/131 |
| 2008/0073462 A1* | 3/2008 | Wolf et al. | 244/118.1 |
| 2008/0180006 A1* | 7/2008 | Hillen et al. | 312/245 |
| 2011/0253714 A1 | 10/2011 | Ivester et al. | |
| 2011/0254705 A1* | 10/2011 | Hashberger et al. | 340/945 |
| 2013/0247625 A1* | 9/2013 | Geng et al. | 70/276 |

FOREIGN PATENT DOCUMENTS

| | | |
|---|---|---|
| DE | 10 2006 045 189 A1 | 4/2008 |
| DE | 10 2007 003 363 A1 | 7/2008 |
| EP | 1 260 434 A1 | 11/2002 |

* cited by examiner

*Primary Examiner* — Christopher P Ellis
*Assistant Examiner* — Jessica Wong
(74) *Attorney, Agent, or Firm* — The Webb Law Firm

(57) ABSTRACT

A power assist device for use in a luggage bin with a drop-down shell has a load measuring mechanism, a power assist mechanism, and an actuation mechanism. The load measuring mechanism is changed from the inactive operating state to the active operating state by the actuation mechanism when the load determined by the load measuring mechanism exceeds a specified threshold that is larger than an assist force. The actuation mechanism has cooperating locking elements of which a first element is connected to a first abutment point and a second element is connected to a second abutment point. The locking elements can move relative to one another such that, in an inactive operating state, the one locking element meshes with a friction fit into the cooperating other locking element and releases it in an active operating state.

10 Claims, 13 Drawing Sheets

LIFT ASSIST

CROSS-REFERENCE TO RELATED APPLICATION

This application claims priority to German Patent Application No. 10 2013 003 364.0 filed Mar. 1, 2013, the disclosure of which is hereby incorporated in its entirety by reference.

BACKGROUND OF THE INVENTION

1. Field of the Invention

The invention relates to a power assist device for use in a luggage bin with a drop-down shell, in particular in a passenger aircraft with
- a load measuring mechanism for determining the load acting on the drop-down shell of the luggage bin;
- a power assist mechanism to apply an assist force to the shell counteracting the load where the power support mechanism has a mechanical spring whose end areas can move in an actuation direction toward one another against the return force of the spring from a first position into a second position and where a first end area of the spring can be supported by way of a first abutment point on a base section and a second end area of the spring can be supported by way of a second abutment point against a support element that can be connected to the shell;
- an actuation mechanism set up to bring the power assist mechanism into an inactive operating state where moving the spring from the second position into the first position is blocked and an active operating state in which the spring can be moved from the second position into the first position;
- where the load measuring mechanism has a control connection with the actuation mechanism such that the actuation mechanism is changed from the inactive operating state to the active operating state if the load determined by the load measuring mechanism exceeds a specified threshold that is greater than the assist force.

2. Description of Related Art

Such a power assist device is known from DE 10 2006 045 189 B4. It has a luggage shell attached to a bracket. It is possible to pivot this shell from a lower, open position into the upper, closed position. So that the luggage shell can be pivoted by the user more easily from the open position into the closed position when carrying a heavier luggage load, the power assist device is equipped with a gas spring that can be brought into an active operating state and an inactive operating state.

In the active operating state, the gas spring is compressed while lowering the luggage shell from a first position corresponding to the closed position of the luggage shell into a second position corresponding to the open position of the luggage shell. In a corresponding manner, the gas spring expands from the first position into the second position when the luggage shell is pivoted from its lower, open position into its upper, closed position. During this process, the gas spring applies a constant assist force to the luggage shell that counteracts the luggage load acting on the shell and is less than this load.

If the load acting on the luggage bin drop-down shell is smaller than the assist force of the gas spring, the power assist mechanism is in the inactive operating state in which the luggage shell is pivoted from the lower, open position to the upper, closed position by the manual force of the user alone.

So that the operating state of the power assist device can automatically adapt to the load acting on the drop-down shell of the luggage bin, the power assist device has a load measuring mechanism that measures the load acting on the shell. The load measuring mechanism has a control connection with the actuation mechanism by way of an electronic control unit such that the actuation mechanism is changed from the inactive operating state to the active operating state when the load determined by the load measuring mechanism exceeds a specified threshold that is larger than the assist force and the luggage shell is in its lower, open position. In these circumstances, the open position of the luggage shell is detected using a touch sensor attached to one end stop, connected to the bracket, with which the luggage shell makes contact in the open position. To switch from the active operating state to the inactive operating state, a stepper motor driven by means of the control system closes a valve located in the gas spring and this valve blocks the gas spring in its second, compressed position corresponding to the open position of the luggage shell.

The previously known power assist device, however, has the disadvantage that, in the event of a fault in the electronic control system and/or in the touch sensor, it may occur that the valve of the gas spring actuates when the luggage shell is not in the open position. In this case, the luggage shell is blocked in the position in question, a situation that may result in it no longer being possible to open the luggage bin to remove the luggage inside.

As a result, the task is to create a power assist device of the type described above in which blocking of the drop-down shell in the closed position and/or an intermediate position between closed and open is reliably avoided.

SUMMARY OF THE INVENTION

This task is achieved by a power assist device of the type described above wherein the actuation mechanism has at least two cooperating locking elements of which a first locking element is connected to the first abutment point and a second locking element is connected to the second abutment point and that the locking elements can be moved perpendicular to the actuation direction between an activation position and a locked position relative to one another so that, in the inactive operating state, the one locking element meshes with a friction fit with the cooperating other locking element and that, in the active operating state, the one locking element releases the other locking element.

Advantageously, this reliably ensures, even if an electronic control system provided for switching the operating states of the power assist mechanism should fail, that the shell of the luggage bin can be opened and closed by the user and, in particular, any luggage can be removed from the luggage bin.

In one preferable embodiment of the invention, a toggle is connected in a hinged manner to the base section and this toggle has a first leg and a second leg that can be pivoted relative to the first leg about a knee joint axis with the toggle being supported on the base section by means of pivot bearings and has a drive connection with the first locking element such that the toggle, in the locked position of the first locking element, is located in or near the dead center position of the toggle and a force acting on the first locking element, which is in the locked position, in the direction of the activation position is essentially supported in the longitudinal direction of the toggle against the toggle and that the legs of the toggle are at an angle in the activation position. In the locked position, then, moving the first locking element using the toggle is inhibited so that in the event that forces, which, for example, might be caused by acceleration and/or vibrations, should act on the first locking element, the first locking element is kept securely in the locked position. As the toggle in this case is located in or near its dead center position, energy is needed for changing the operating state of the power assist mechanism but not needed for keeping the first locking element in the locked position.

It is advantageous if at least one leg in or near the dead center position of the toggle can be positioned with respect to at least one stop spaced apart from the knee joint axis and if the actuation mechanism has at least one first return element by means of which this leg can be pressed against the stop. This can even more reliably prevent an unintentional movement of the toggle and thus of the first locking element in the event of acceleration forces or vibrations.

In one practical embodiment of the invention, the first locking element is connected to the toggle by way of an operating lever. The operating lever is connected with the base section so as to pivot about a pivot axis; the operating lever can be supported on one support point spaced apart from the pivot axis with respect to the first locking element and is connected to the first leg of the toggle so it can pivot about a first joint axis spaced apart from the support point and from the pivot axis, and running parallel to the pivot axis. The second leg is connected to the base section so it can pivot about another joint axis located in parallel with the pivot axis. In this way, the power assist device allows a narrow structural shape in which the toggle can be located on the base section in the space along a straight-line extension of the spring.

In a preferred embodiment of the invention, the actuation mechanism has an electromagnet with an electromagnetically moving actuation element by means of which the toggle can be moved from the locked position into the activation position in which the actuation element can be pushed between a position of rest and a working position perpendicular to the knee joint axis. In this embodiment, the electromagnet serves as an inexpensive electric drive for moving the operating stage of the actuation mechanism.

In a refinement of the invention, the actuation element is designed as a striker that, in the position of rest, is spaced apart by a free space from an actuation point of the toggle that is at a distance from the joint axis and that, in the working position, is positioned against the actuation point. For changing the operating state of the actuation mechanism, the actuation element, in its position of rest, can be accelerated by the magnetic force of the electromagnet into the free space such that it has kinetic energy when it contacts the toggle and this energy is sufficient to move the toggle. Under these circumstances, the electromagnet can be of an appropriately small size so that it only has a small current consumption.

Advantageous is the case that, if the spring is designed as a helical spring and if a hydraulic damping mechanism is located within the helical spring and this damping mechanism has at least one piston located so that it can be pushed into an operating cylinder, and if the support element is connected to the first and/or second abutment point by way of the damping mechanism. The motion of the support element and the shell, which is connected to it, is damped by the damping mechanism and still allows the power assist device to be of a very compact size because the damping mechanism is accommodated within the helical spring.

In a practical embodiment of the invention, the first locking element is designed as a stud mounted so that it can move perpendicular to the axial direction of the operating cylinder on the base section and the second locking element is designed as a recess provided on the operating cylinder or connected to it. In this case, it is even possible that the recess is a ring groove located concentrically with respect to the longitudinal central axis of the helical spring and this groove is connected to the second abutment point by way of the operating cylinder located within the helical spring.

In a preferred embodiment of the invention, a blocking element is located on the base section and this blocking element can be moved in the axial direction of the operating cylinder against the return force of a second return element from the blocking position into an open position. The blocking element is positioned in the blocking position on the first locking element such that this locking element is latched in the activation position. The operating cylinder or a component connected to it can be positioned with respect to the blocking element when moving the power assist mechanism from the active operating state to the inactive operating state such that the blocking element is forced out of the blocking position into the open position. The blocking element holds the first locking element and the toggle that is in a drive connection with this element automatically in the activation position until the drop-down shell is closed again or brought into a position in which the operating cylinder forces the blocking element into the open position. The electromagnet can thus be unpowered in the activation position of the locking elements.

In a preferred embodiment of the invention, the end areas of the mechanical spring can be brought from the second position into a third position by applying a load to the drop-down shell of the luggage bin greater than the threshold and against the return force of the spring. In this embodiment, the actuation mechanism for measuring the position of the support element relative to the base section has a position measuring mechanism by means of which at least a first position and a second position of the support element relative to the base section can be detected. In this embodiment, the second position corresponds to the position of the support element when the shell is pivoted by a predefined amount from the open position, that is, when unloaded, in the direction of the closed position. Also, in this embodiment, the position measuring mechanism has a control connection with the electromagnet by means of a control system with a master clock such that the actuation element is positioned against the actuation position of the toggle when the position measuring device detects initially the first position and then the second position within a predefined time window. The actuation mechanism is thus switched from the inactive operating state to the active operating state if, within the time window that, for example, can have a duration of one second, a load that exceeds the specified threshold is first placed on the open luggage shell and if then, within the time window, the user lifts the luggage shell up to beyond the second position. In this process, it is assumed that no luggage is removed from the luggage shell during the time window.

An exemplary embodiment of the invention is explained in more detail below using the drawings.

DESCRIPTION OF THE INVENTION

Figure 1:
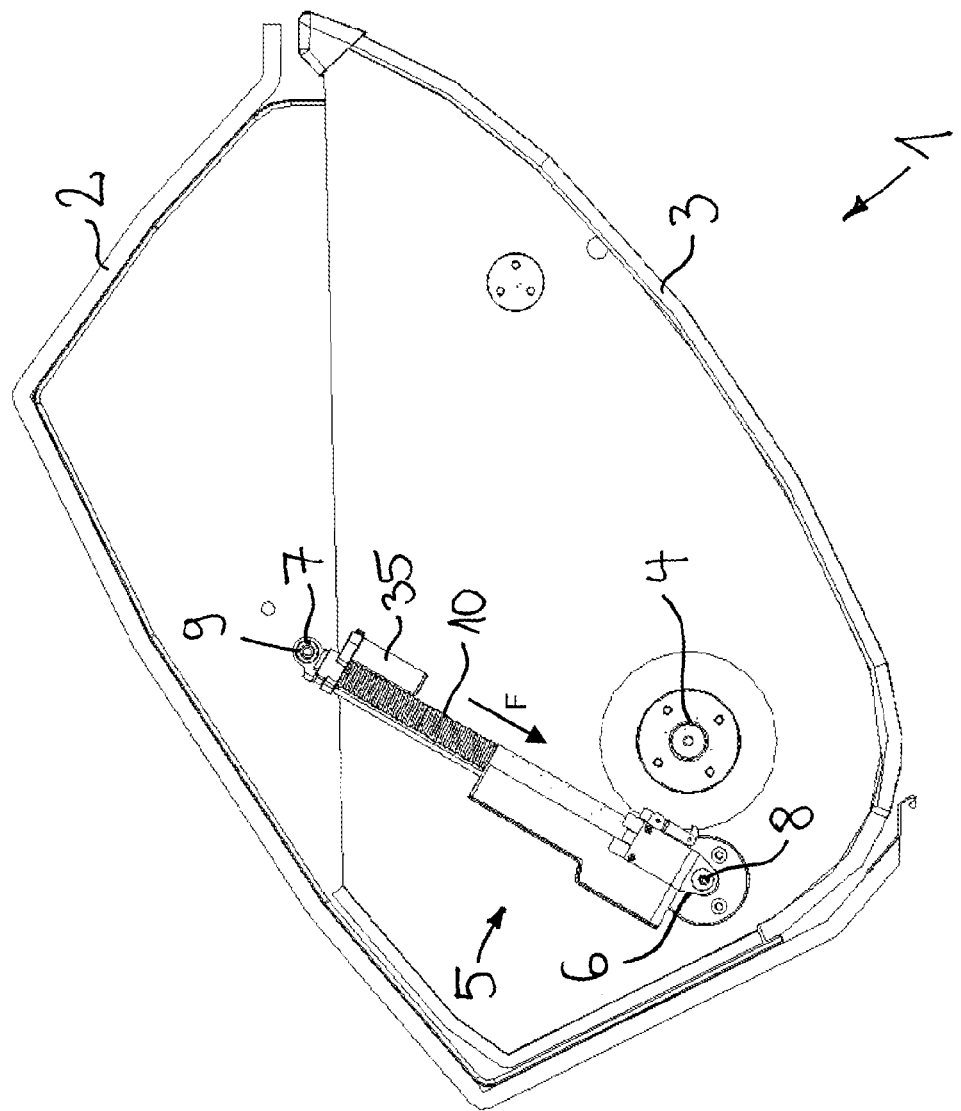
FIG. 1 shows a cross section through a luggage bin of a passenger aircraft having a drop-down shell and a power assist device for this shell with the shell being shown in the raised, closed position.

A luggage bin, identified in its entirety with 1, in a passenger compartment of a passenger airplane has a housing 2 to which a drop-down shell 3, which serves to accommodate pieces of luggage, is attached. The shell 3 can be pivoted about a roughly horizontal, notional axis by means of thrust bearings 4, connected to the housing 2 and can be pivoted in a closed position (FIG. 1) and an open position (FIG. 2) relative to the housing 2. In the closed position, the shell 3 can be locked to the housing 2 by means of a locking mechanism not shown in more detail in the drawing.

The thrust bearings 4 are located on the shell 3 such that, when the shell 3 is loaded with luggage, the center of gravity of the shell 3 and that of the luggage contained therein are spaced apart in the horizontal direction from the axis of the thrust bearings 4 so that a torque acts on the shell 3 and this torque pivots the shell 3 downward.

Figure 2:
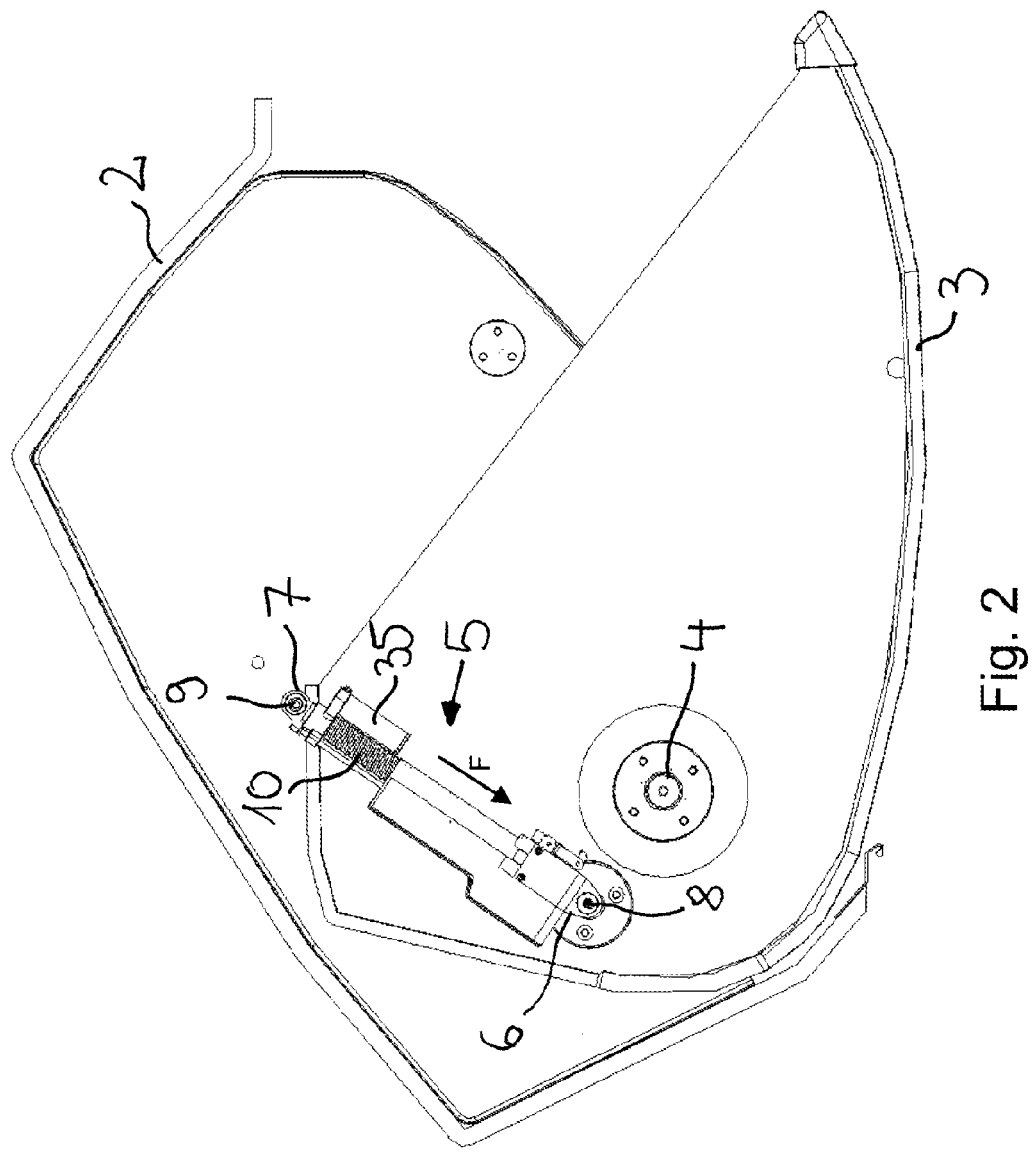
FIG. 2 is similar to FIG. 2 but the shell is shown in the lowered, open position.

So that the luggage shell, when loaded, can still easily be pivoted by the user from the open position upward into the closed position, the luggage bin 1 has a power assist device, identified in its entirety by 5, for the shell 3. It can be seen in FIG. 3 that the power assist device 5 is designed as an elongated assembly that has a base section 6 at one end and a support element 7 at its other end that can be moved relative to this end. As shown in FIGS. 1 and 2, the base section 6 is connected to the housing 2 in a hinged manner by way of a first axial bearing 8 spaced apart from the axis of the thrust bearings 4. The support element 7 is connected to the shell 3 in a hinged manner by way of a second axial bearing 9 to a point spaced apart from the axis of the thrust bearings 4.

To apply an assist force F to the shell 3 counteracting the load, the power assist device 5 has a power assist mechanism with a mechanical spring 10 having a plurality of spring windings extending along a notional helix about a longitudinal center axis 11. The opposite-facing end areas of the spring 10 can be moved toward one another in an actuation direction against the return force of the spring material from a first position, shown in FIGS. 3 and 4, into a second position, shown in FIGS. 5 and 6. In the first position of the spring 10, the luggage bin 1 is closed and in the second position, it is open.

Figure 4:
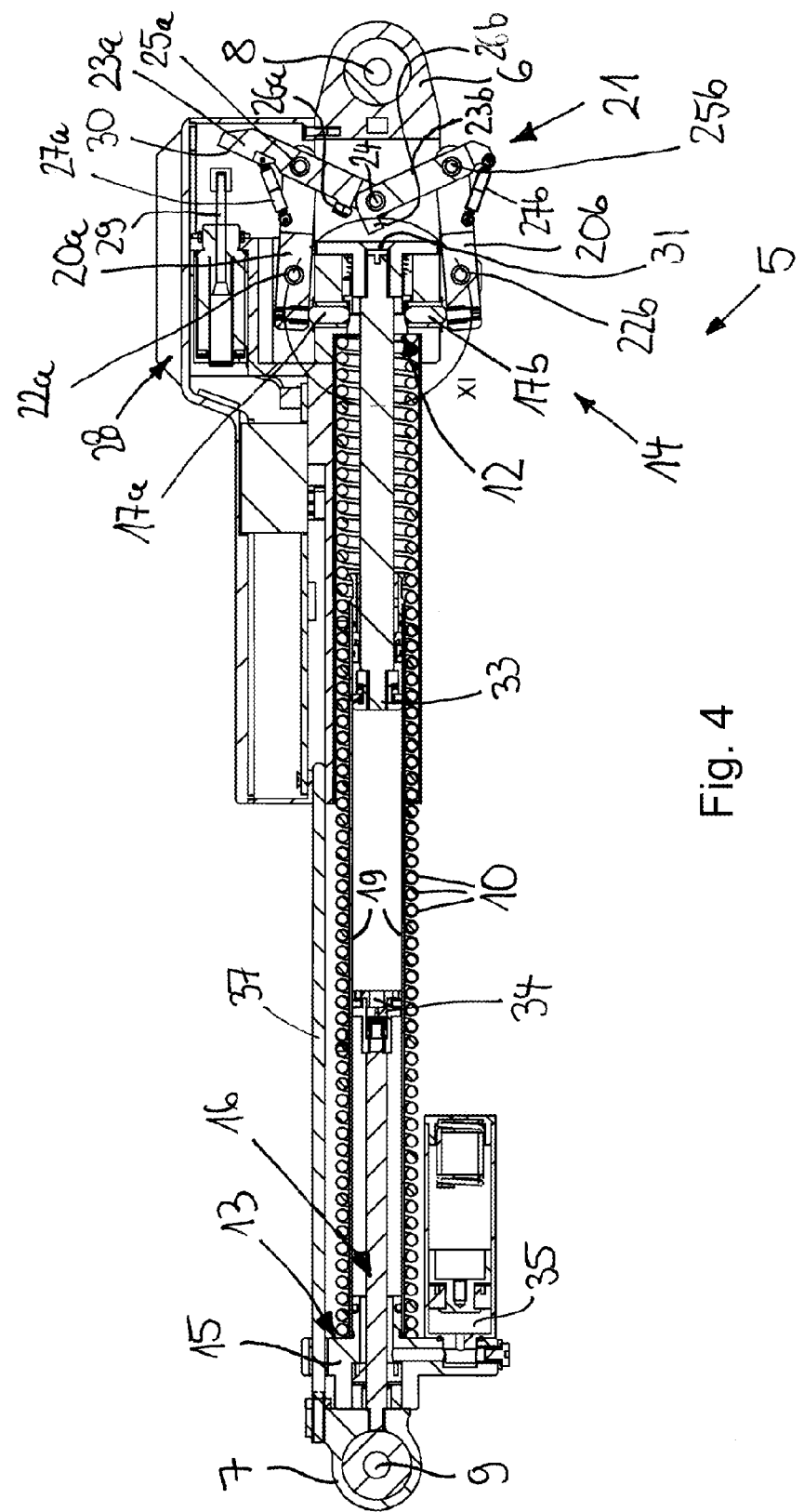
FIG. 4 shows a longitudinal section through the power assist mechanism depicted in FIG. 3.
Figure 5:
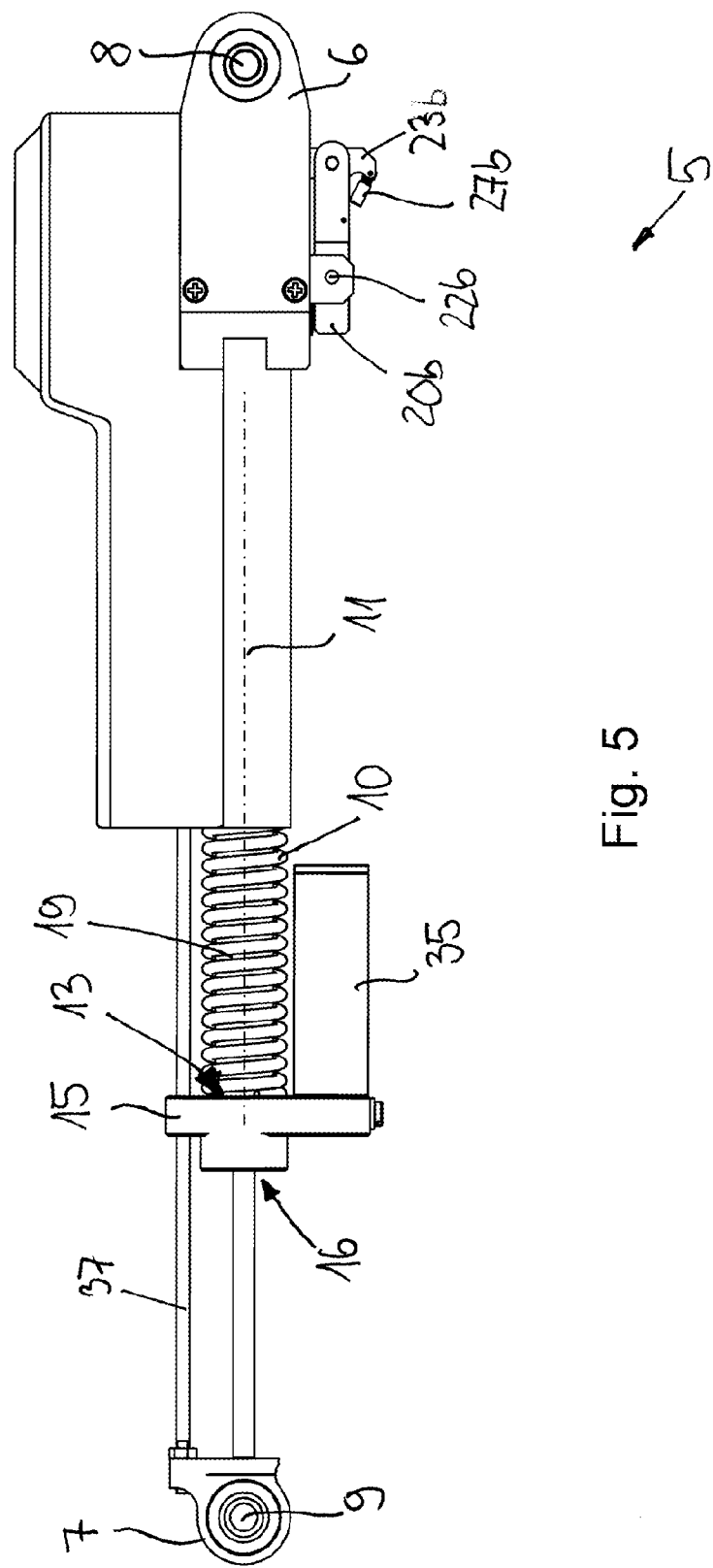
FIG. 5 is similar to FIG. 3 but the power assist mechanism is in an inactive operating state.
Figure 6:
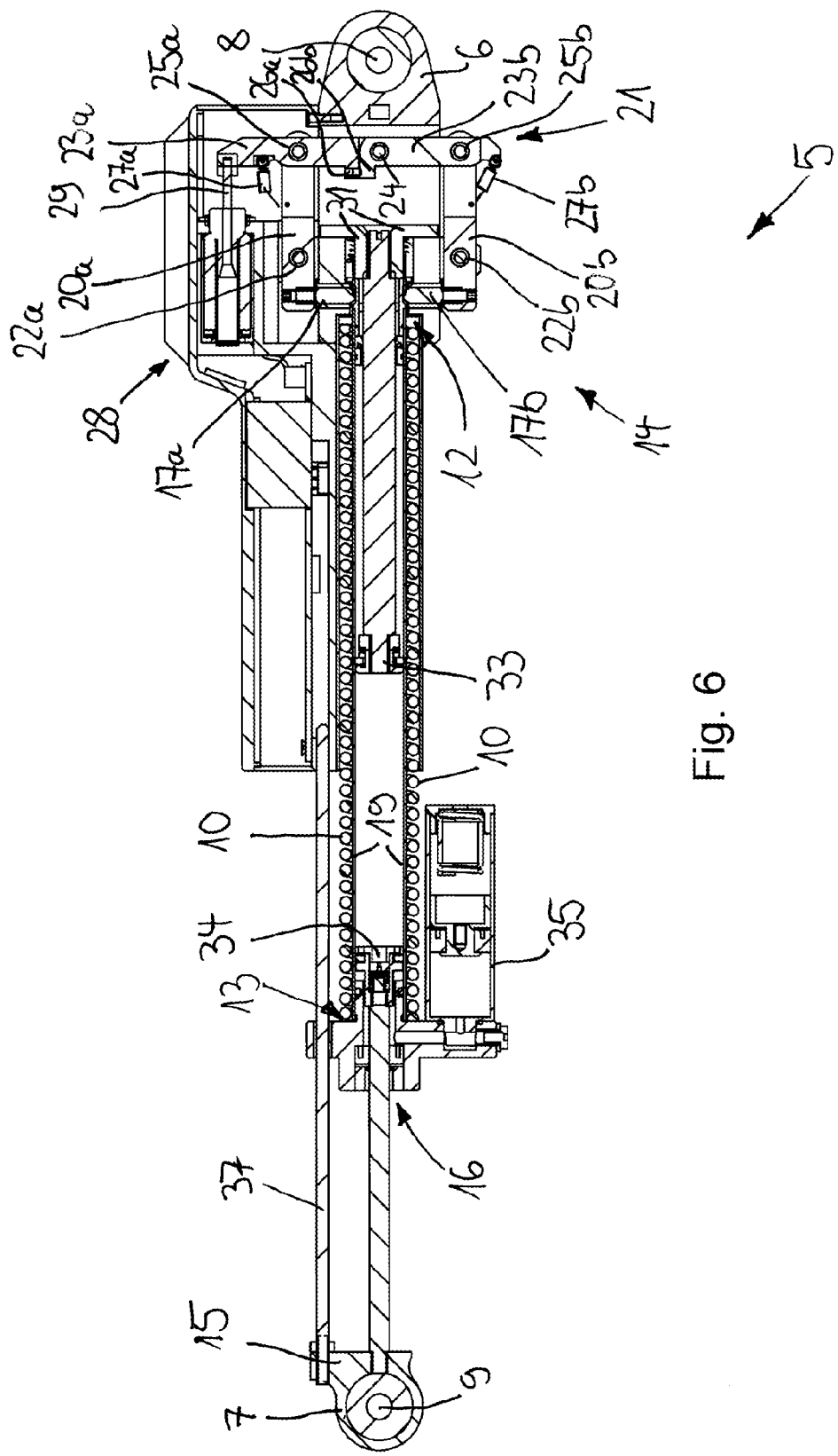
FIG. 6 shows a longitudinal section through the power assist mechanism depicted in FIG. 5.

FIGS. 4 and 6 show that a first end area of the spring 10 is supported against a first abutment point 12 on the base section 6 and a second end area of the spring 10 is supported against a second abutment point 13.

By means of an actuation mechanism identified in its entirety using 14, the power assist mechanism 5 can be moved into an active operating state (FIGS. 3 and 4) in that the spring 10 is moved between the second position and the first position and the mechanism can be moved into an inactive operating state (FIGS. 5 and 6) in that the movement of the spring 10 from the second position into the first position is blocked. In the active operating state, the component bearing the second abutment point 13 is pressed on the support element 7. In the inactive operating state, the component 15 bearing the second abutment point 13 is spaced apart from the support element 7 in the direction of the longitudinal center axis 11 with the shell 3 closed. The support element 7 can be moved in the direction of the longitudinal center axis 11 relative to the component 15 by means of a linear guide 16.

Figure 7:
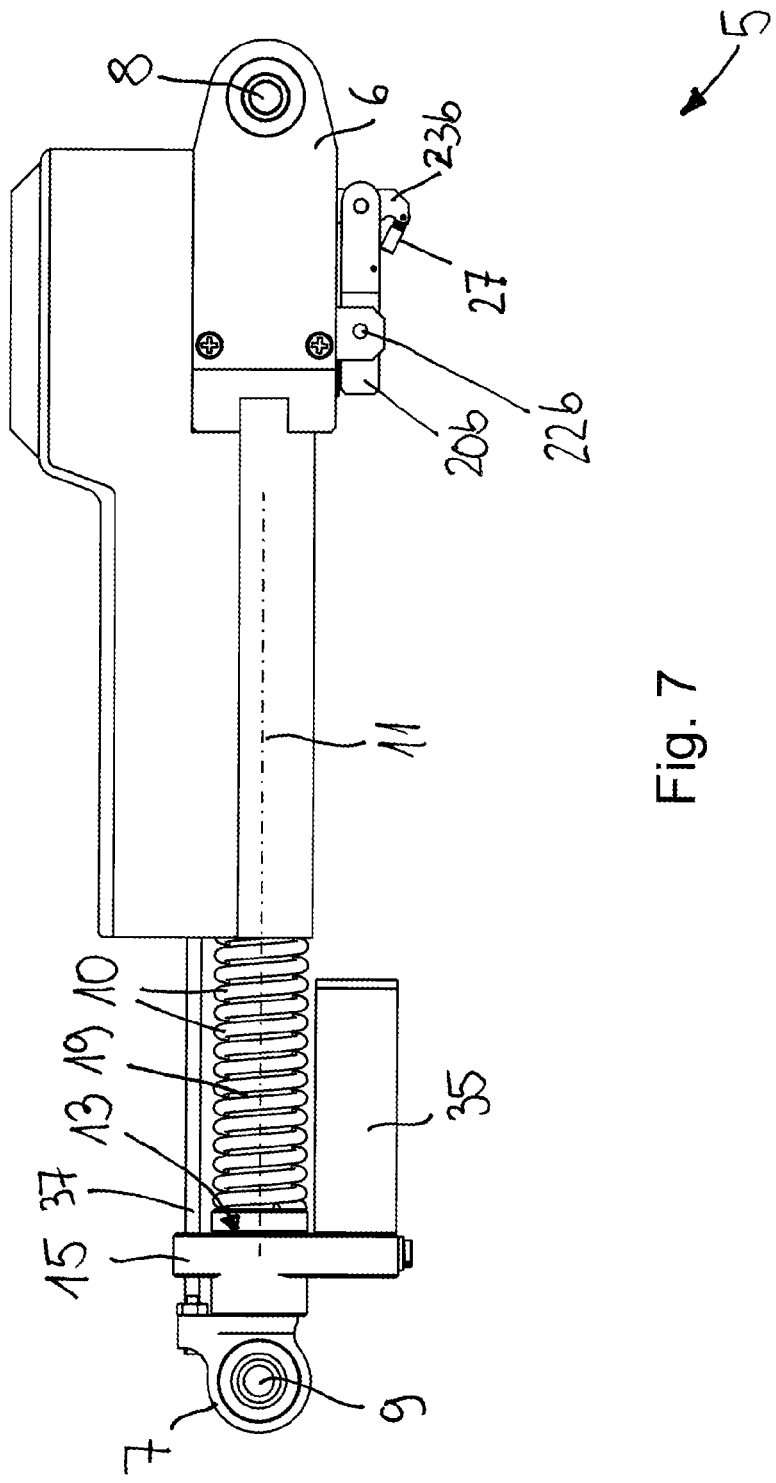
FIG. 7 illustrates a side view of the power assist mechanism in the inactive operating state with the drop-down shell in the open position.
Figure 8:
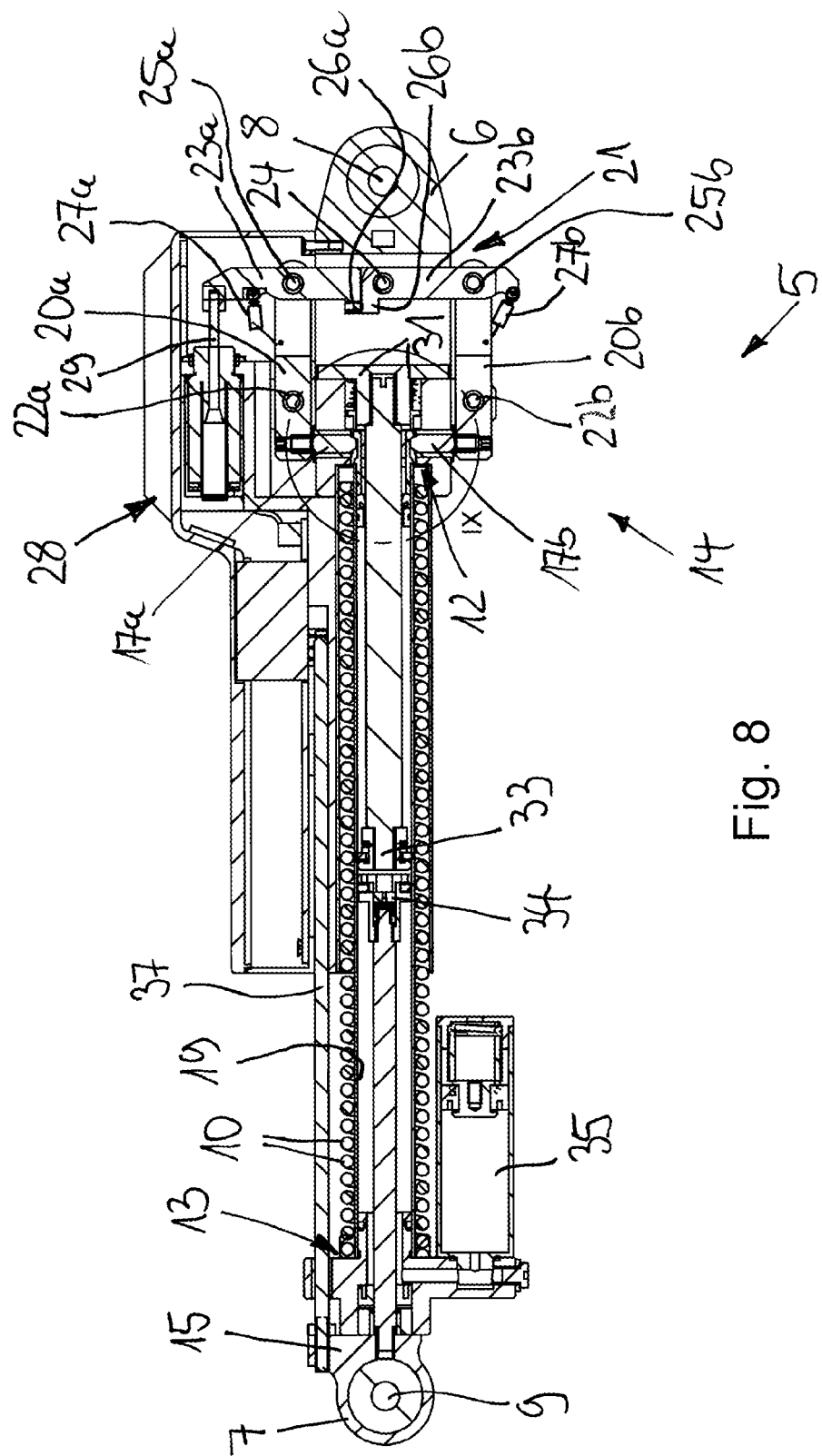
FIG. 8 shows a longitudinal section through the power assist mechanism depicted in FIG. 7.

FIGS. 7 and 8 show the power assist device 5 in the inactive operating state with the shell 3 open. It can clearly be seen that the component 15 accommodating the second abutment point 13 makes contact with the support element 7 in this case and that the shell 3 connected to the support element 7 is thus supported on the spring 10.

To determine the load acting on the drop-down shell 3 of the luggage bin 1, the power assist device 5 has a load measuring mechanism to be described in more detail having a control connection with an electromagnet 28 of the actuating mechanism 14 by way of an electronic control unit. The control mechanism compares the load determined by the load measuring mechanism to a specified threshold and switches the actuation mechanism 14 from the inactive operating state to the active operating state if the load exceeds the threshold and the shell 3 is closed shortly thereafter.

Figure 9:
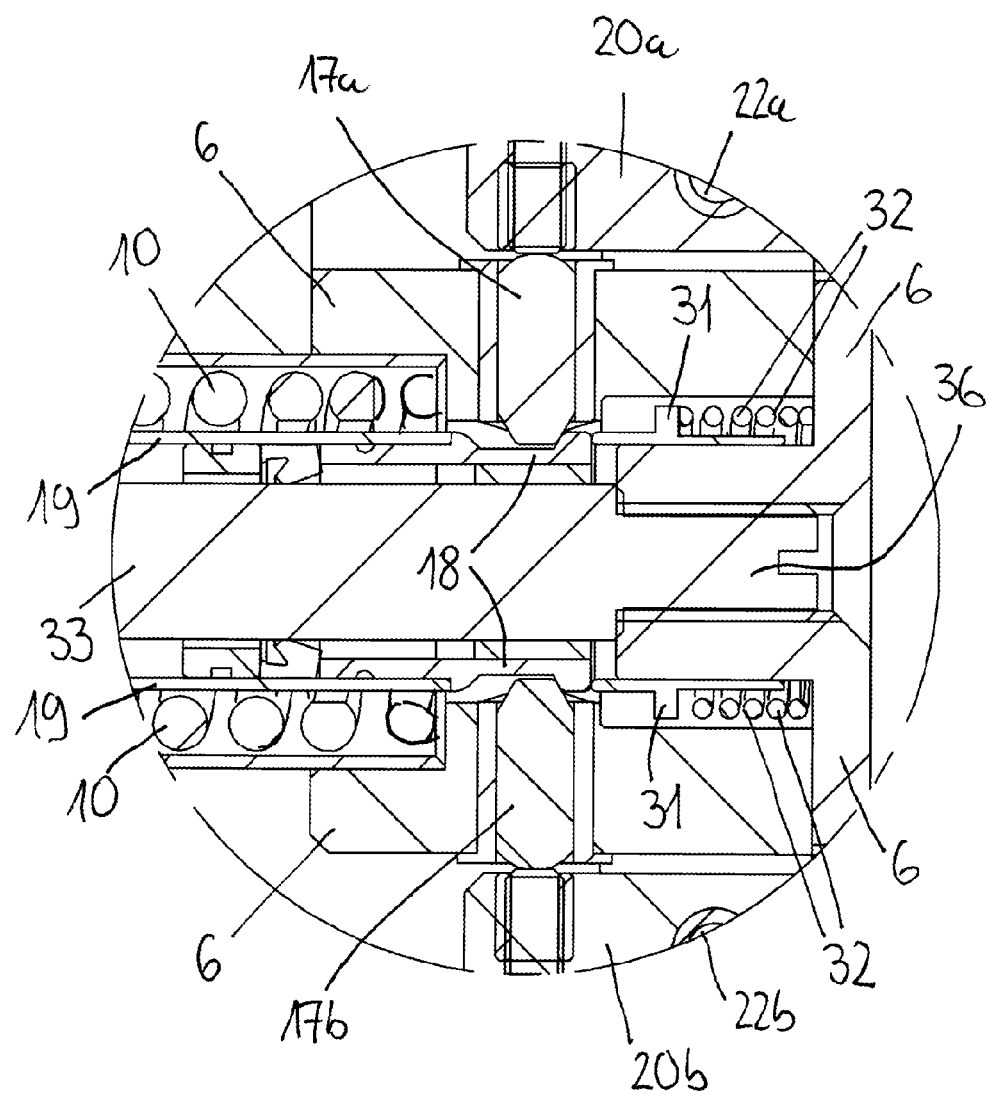
FIG. 9 shows an enlarged section of FIG. 8 with the lowered shell either unloaded or carrying a load below a specified threshold.
Figure 10:
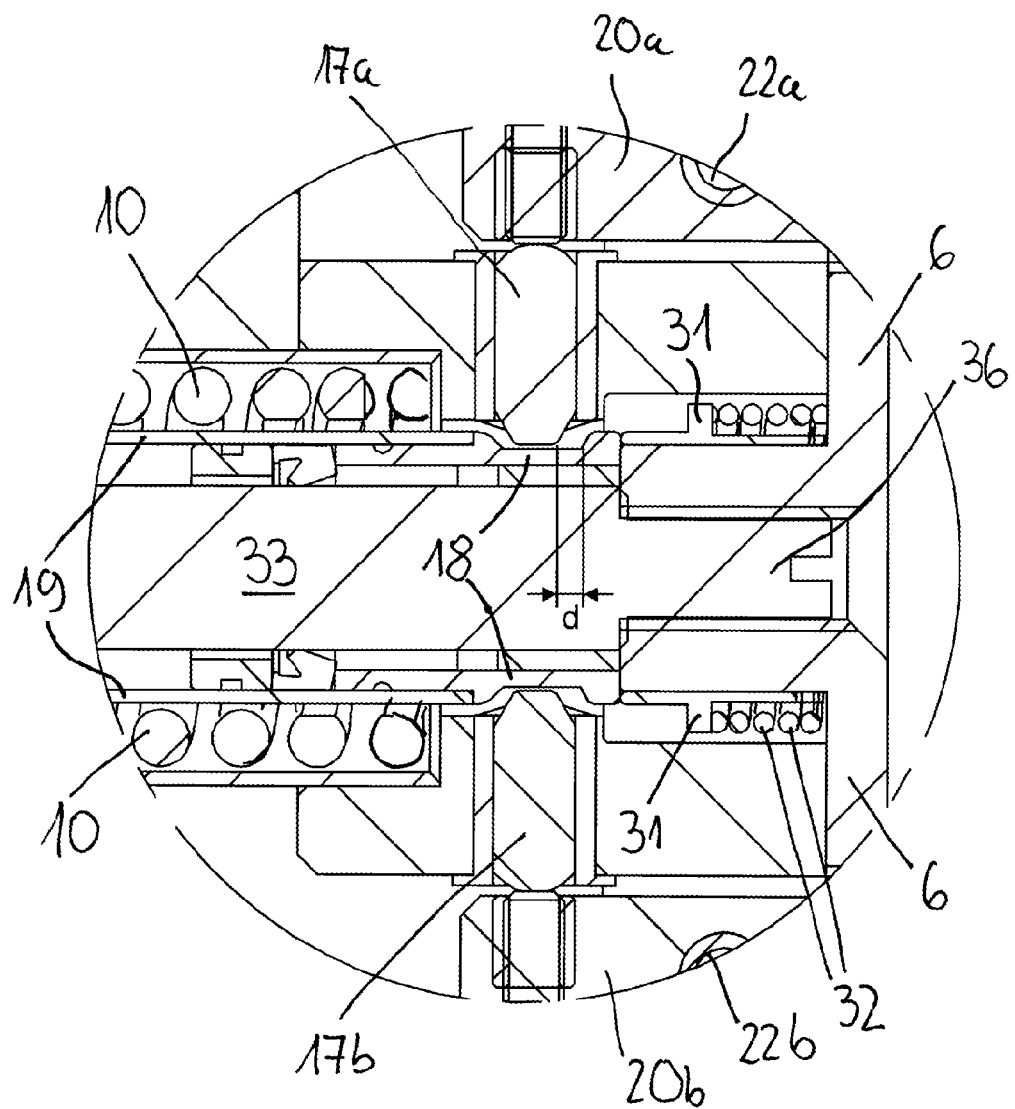
FIG. 10 is similar to FIG. 9 with the lowered shell carrying a load exceeding the specified threshold.
Figure 11:
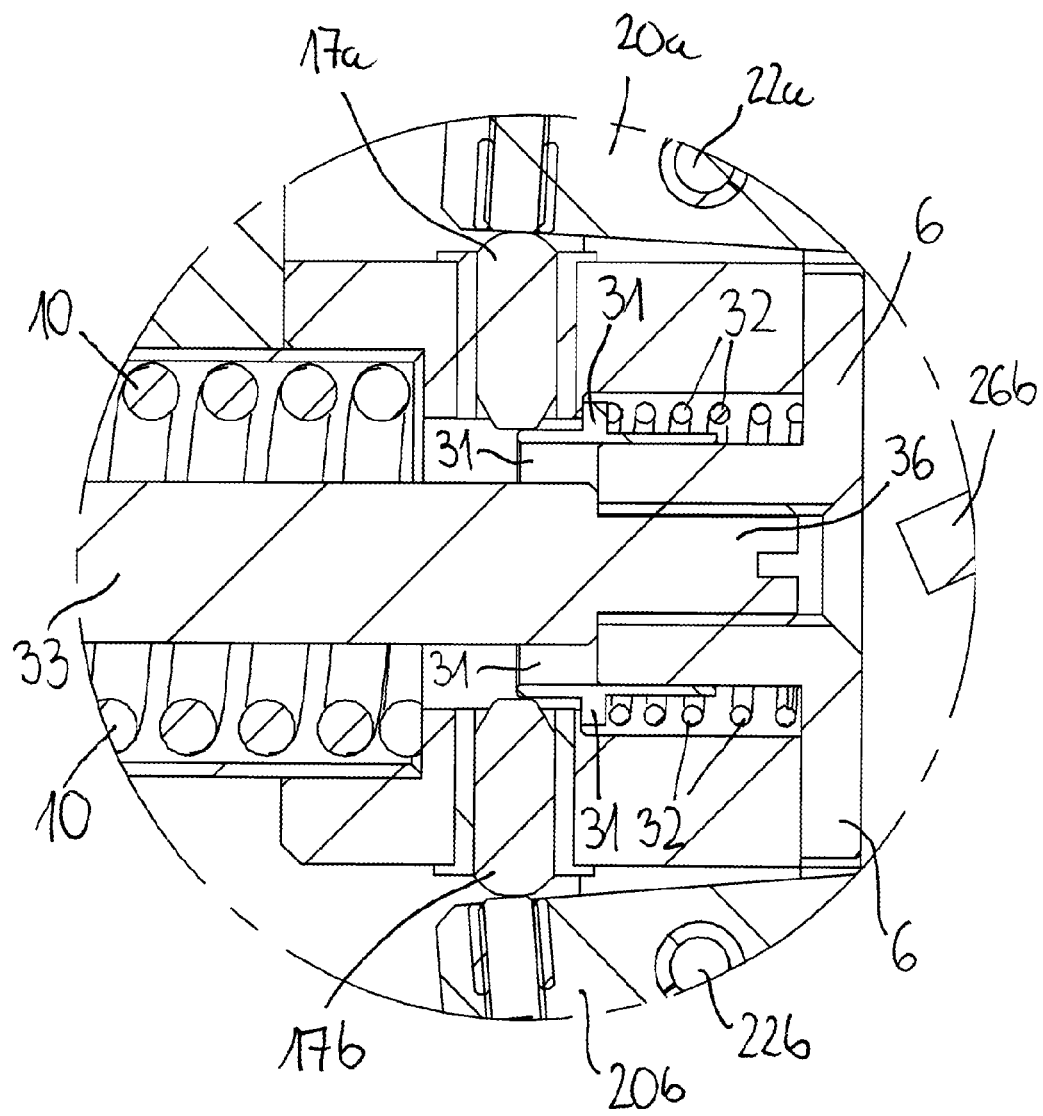
FIG. 11 is an enlarged section of FIG. 4.

FIG. 9 shows that the actuation mechanism has two first locking elements 17a, 17b, which are shaped like pins or studs, located so that they can move on the base section 6 radially with respect to the longitudinal center axis 11 of the spring 10 and that these locking elements can be moved relative to the base section 6 between a locked position (FIGS. 9 and 10) and an activation position (FIG. 11). The two first locking elements 17a, 17b are offset by 180 degrees from one another with respect to the longitudinal center axis 11. The first locking elements 17a, 17b cooperate with a second locking element 18 designed as a ring groove. This second locking element is permanently connected to the second abutment point 13 by means of an operating cylinder 19 arranged concentrically with respect to the longitudinal center axis 11.

With the actuation mechanism 14 in the inactive operating state, the first locking elements 17a, 17b mesh with a friction fit into the second locking element 18. In this case, the spring 10 is compressed between the abutment points 12, 13. In the inactive operating state, the tension in the spring 10 cannot be released beyond its position shown in FIG. 5.

The groove of the second locking element 18 is larger in the direction of the longitudinal center axis 11 than the corresponding size of the end sections of the first locking elements 17a, 17b meshing in the second locking element 18 so that the operating cylinder 19 and the second abutment point 13 connected to it can be moved back and forth relative to the base section roughly in the direction of the longitudinal center axis 11 if the first locking elements 17a, 17b are in the locked position. If there is no load on the shell 3, the first locking elements 17a, 17b make contact with the inner wall of the second locking element 18 at a distance from the second abutment point 13 (FIG. 9). In this case, the support element 7 makes contact with the component 15 containing the second abutment point 13 (FIG. 7).

If the shell 3 has at first either no load or carries a load that is less than the specified threshold and then a load that is larger than the specified threshold is applied to the shell 3, the first locking elements 17a, 17b are spaced apart from the inner wall of the second locking element 18 and this wall is at a distance from the second abutment point 13 (FIG. 10). In this case, the second locking element 18 is moved with respect to FIG. 9 by the length d in the direction of the longitudinal axis 11 relative to the base section 6 and the spring 10 is in a third position. The support element 7 makes contact with the component 15 holding the second abutment point 13 while the load acting on the shell 3 compresses the spring 10 somewhat with respect to the position assumed by the spring 10 when the shell 3 carries no load.

With the actuation mechanism 14 in the inactive operating state, the first locking elements 17a, 17b do not mesh with the second locking element 18. In this operating state, the spring 10 makes contact in every position of the shell 3 with the component 15 containing the second abutment point 13.

FIGS. 4, 6 and 8 show that the first locking elements 17a, 17b are connected to a common toggle 21, each by way of an operating lever 20a, 20b. A first operating lever 20a is connected to the base section 6 so as to pivot by means of a first pivot bearing 22a and a first pivot axis, and a second operating lever 20b is connected to the base section 6 so as to pivot by means of a second pivot bearing 22b and a second pivot axis. The first operating lever 20a can be supported on a first locking element 17a at a first position spaced apart from the first pivot axis and the second operating lever 20b can be supported at the other second locking element 17b at a second position spaced apart from the second pivot axis.

The toggle 21 has a first leg 23a and a second leg 23b that can be pivoted about a knee joint axis 24 relative to the first leg. The first leg 23a is connected to the first operating lever 20a so that it can pivot about a first joint axis by means of a first pivot bearing 26a spaced apart from the knee joint axis 24 and the first pivot bearing 23a. The second leg 23a is connected to the second operating lever 20b so that it can pivot about a second joint axis by means of a second pivot bearing 26b spaced apart from the knee joint axis 24 and the second pivot bearing 23a.

The toggle 21 has a drive connection with the first locking elements 17a, 17b by way of the operating levers 20a, 20b such that the toggle 21 is located in the locked position of the first locking elements 17a, 17b in its dead center position. As shown in FIGS. 6 and 8, in this case the legs 23a, 23b are a straight-line extension of one another and located roughly parallel to the first locking elements 17a, 17b. The first locking elements 17a, 17b located in the locked position are inhibited from unintentionally moving into the activation position by the toggle 21.

As depicted in FIG. 4, the legs 23a, 23b of the toggle 21 are at an angle in the activation position. In this way, the first locking elements 17a, 17b can be moved between their locked position and their activation position toward one another and away from one another.

The legs 23a, 23b have stops 26a, 26b assigned to one another that are located such that they make contact with one another in the dead center position of the toggle 21. A return element 27a, 27b, designed as a tension spring, is located between the first operating lever 20a and the first leg 23a, and between the second operating lever 20b and the second leg 23b. The stops 26a, 26b can be pressed against each other in the dead center position by means of these return elements.

The actuation mechanism 14 has an electromagnet 28 with an electromagnetically moving actuation element 29 by means of which the toggle 21 can be moved from the locked position into the activation position. The actuation element 29 can be moved perpendicular to the knee joint axis 24 roughly parallel to the longitudinal center axis 11 between a position of rest and a working position.

The actuation element 29 is designed as a striker that, in the position of rest, is spaced apart by a free space from an actuation point 30 (FIG. 4) of the toggle 21 that is at a distance from the knee joint axis 24 and that, in the working position, is positioned against the actuation point 30.

It can be seen in FIGS. 9 to 11 that a sleeve-shaped blocking element 31 is attached to the base section and this element can be moved in the direction of the longitudinal center axis 11 of the spring 10 against the return force of a second return element 32 designed as a helical spring from a blocking position (FIG. 11) into an open position (FIGS. 9 and 10). In the blocking position, the blocking element 31 is positioned before the first locking elements 16a, 17b such that these are held in the activation position. The second locking element 18 can be positioned by axial movement of the operating cylinder 19 and the component 15 connected to this cylinder along the longitudinal center axis 11 against the blocking element 31 such that this element is pushed out of the blocking position into the open position such that the first locking elements 17a, 17b can be pushed into the groove of the second locking element 18.

Figure 3:
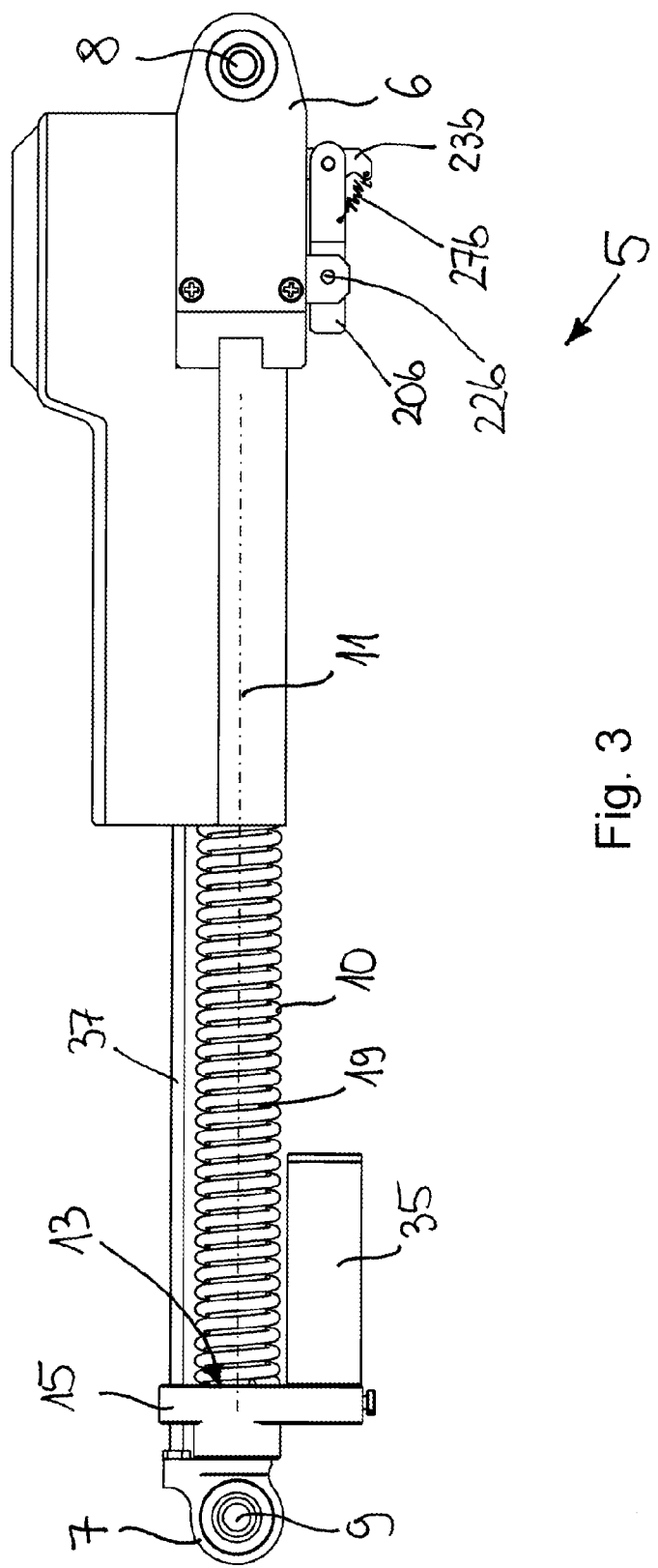
FIG. 3 depicts a side view of the power assist mechanism in an active operating state with the drop-down shell in the closed position.

As shown particularly well in FIGS. 3 and 4, the operating cylinder is part of a hydraulic damping mechanism that has a first piston 33 located so that it can be moved in the operating cylinder 19 and a second piston 34 located so that it can be moved in the operating cylinder 19 relative to the first piston 33 and the operating cylinder 19. The first piston 33 is connected to the base section 6 and can be moved in the direction of the longitudinal center axis relative to the base section 6 by means of a set screw 36. The second piston 34 is connected to the support element. The pistons 33, 34 each have at least one hole for the passage of a hydraulic fluid present inside the operating cylinder 19. The interior of the operating cylinder 19 is connected to an equalizing tank 35 for the hydraulic fluid via a fluidic channel. The equalizing tank is attached on the side of the component 15 next to the operating cylinder 19.

Figure 12:
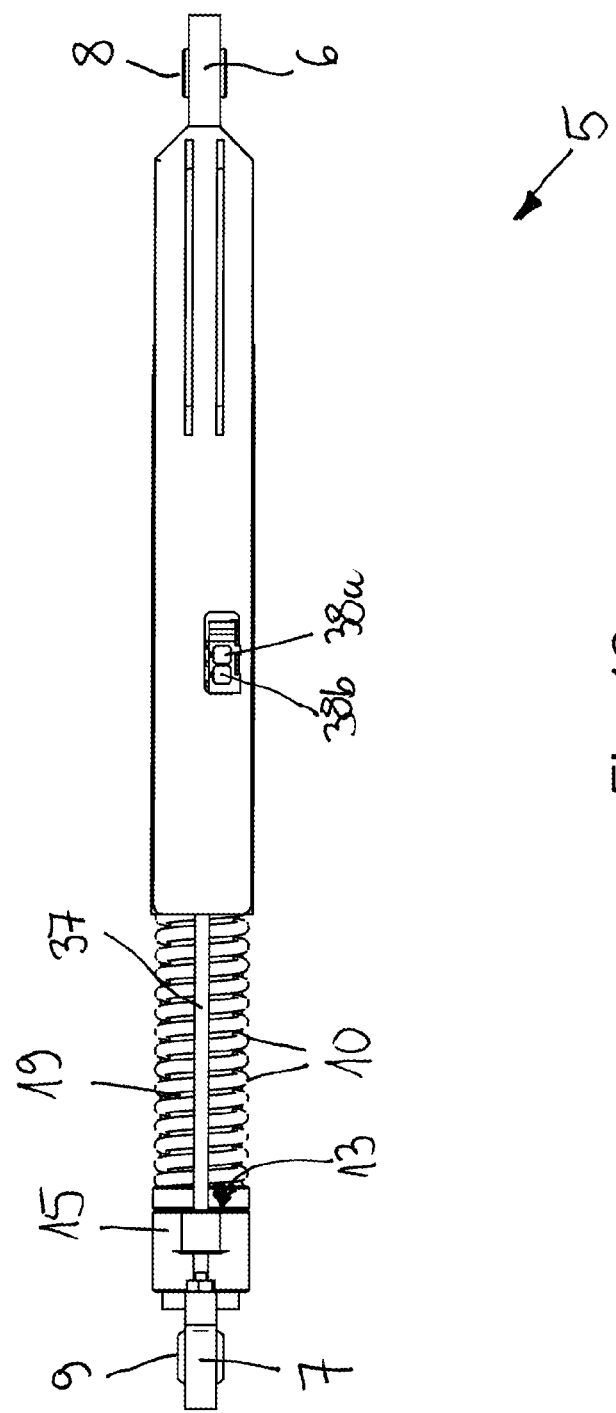
FIG. 12 is a top view onto the power support mechanism.
Figure 13:
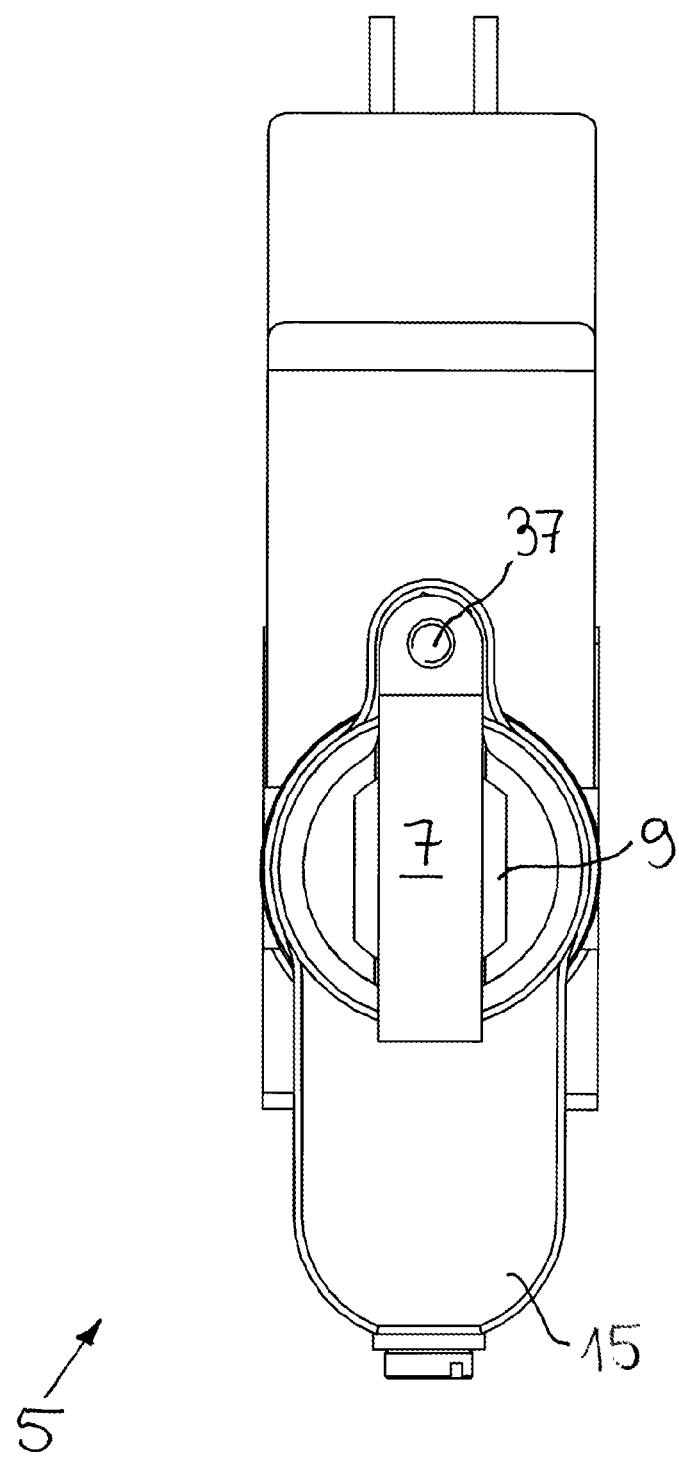
FIG. 13 is a front view of the power support mechanism.

For detecting the position of the shell 3, the actuation mechanism 14 has a position measuring mechanism having a signaling rod 37 connected to the support element 7. This rod extends in parallel to the longitudinal center axis 11 of the spring 10. As shown in FIG. 12, the position measuring mechanism has two detectors 38a, 38b positioned in fixed locations with respect to the base section 6. These detectors are offset from one another in the direction of the longitudinal center axis 11.

Each of these detectors 38a, 38b can detect the free end of the signaling rod 37 when it moves past the corresponding detector 38a, 38b. With a first detector 38a, the output signal changes if the shell 3 pivots beyond a first position corresponding to that position assumed by the shell 3 when it is carrying a load corresponding to the specified threshold. With a second detector 38 located nearer to the support element 7 than the first detector 38a, the output signal changes if the shell 3 pivots beyond a second position between a first position corresponding to the position of the unloaded shell 3 when the support element 7 makes contact with the component 15 when the actuation mechanism 14 (FIG. 2) is inactive and a second position corresponding to the position of the shell 3 when it is completely closed. Under these circumstances, the second position is immediately adjacent to the position assumed by the unloaded shell 3 when the support element 7 makes contact with the component 15 when the actuation mechanism 14 is inactive. The position measuring mechanism has a control connection to the electromagnet 28 by way of a control system that is not shown in more detail in the drawings and has a master clock. The actuation element 29 of the electromagnet 28 is positioned against the actuation point 30 of the toggle 21 if the position measuring mechanism first detects the first position and then the second position within a specified time window.

The invention claimed is:

1. A power assist device for use in a luggage bin with a drop-down shell, in particular in a passenger aircraft, comprising:
a load measuring mechanism to determine the load acting on the drop-down shell of the luggage bin;
a power assist mechanism to apply an assist force to the shell counteracting the load with the power assist mechanism having a mechanical spring whose end areas can move toward one another against the return force of the spring from a first position in an actuation direction into a second position, with a first end area of the spring can be supported by a first abutment point on a base section and a second end area of the spring can be supported by a second abutment point against a support element that can be connected to the housing;
an actuation mechanism set up to bring the power assist mechanism in an inactive operating state in which moving the spring from the second position into the first position is blocked and in an active operating state in which the spring can be moved from the second position into the first position;
and the load measuring mechanism has a control connection with the actuation mechanism such that the actuation mechanism is moved from the inactive operating state to the active operating state when the load determined by the load measuring mechanism exceeds a specified threshold larger than the assist force wherein the actuation mechanism has at least two cooperating locking elements of which a first locking element is connected to the first abutment point and a second locking element is connected to the second abutment point and wherein the first locking element and the second locking element can be moved relative to one another perpendicular to the actuation direction between an activation position and a locked position such that, in the inactive operating state, the one locking element meshes with a form fit in the cooperating other locking element and wherein, in the active operating state, the one locking element releases the other locking element.

2. The power assist device according to claim 1, wherein a toggle is connected in a hinged manner to the base section and this toggle has a first leg and a second leg that can be pivoted relative to the first leg about a knee joint axis; wherein the toggle is supported on the base section by means of pivot bearings and has a drive connection with the first locking element; wherein the toggle, in the locked position of the first locking element, is located in or near the dead center position of the toggle and a force acting on the first locking element in the direction of the activation position is essentially supported by the toggle in the longitudinal direction of the toggle; and wherein the leas of the toggle are at an angle in the activation position.

3. The power assist device according to claim 2, wherein at least one leg in or near the dead center position of the toggle can be positioned with respect to at least one stop spaced apart from the knee joint axis; and wherein the actuation mechanism has at least one first return element by means of which this leg can be pressed against the stop.

4. The power assist device according to claim 2, wherein the first locking element is connected to the toggle by way of an operating lever; wherein the operating lever is connected to the base section so as to pivot about a pivot axis; wherein the operating lever can be supported on one support point spaced apart from the pivot axis against the first locking element and is connected to the first leg of the toggle so it can pivot about a first joint axis spaced apart from the support point and the pivot axis and running parallel to the pivot axis; and wherein the second leg is connected to the base section so it can pivot about another joint axis located in parallel with the pivot axis.

5. The power assist device according to claim 2, wherein the actuation mechanism has an electromagnet with an electromagnetically moving actuation element by means of which the toggle can be moved from the locked position into the activation position; and wherein the actuation element can be moved between a position of rest and a working position perpendicular to the knee joint axis.

6. The power assist device according to claim 2, wherein the actuation element is designed as a striker that, in the position of rest, is spaced apart by a free space from an actuation point of the toggle that is at a distance from the knee joint axis and that, in the working position, is positioned against the actuation point.

7. The power assist device according to claim 1, wherein the spring is designed as a helical spring; wherein a hydraulic damping mechanism is located within the helical spring, this damping mechanism having at least one piston located so that it can be pushed into an operating cylinder; and wherein the support element is connected to the first abutment point or second abutment point by way of the damping mechanism.

8. The power assist device according to claim 7, wherein the first locking element is designed as a stud mounted so that it can move perpendicular to the axial direction of the operating cylinder on the base section; and wherein the second locking element is designed as a recess provided on the operating cylinder or connected to it.

9. The power assist device according to claim 7, wherein a blocking element is located on the base section and this blocking element can be moved in the axial direction of the operating cylinder against the return force of a second return element from the blocking position into an open position; wherein the blocking element is positioned in the blocking position on the first locking element such that this locking element is latched in the activation position; and wherein the operating cylinder or a component connected to it can be positioned against the blocking element when moving the power assist mechanism from the active operating state into the inactive operating state such that the blocking element is forced out of the of the blocking position into the open position.

10. The power assist device according to one of claim 1, wherein the end areas of the mechanical spring can be brought from the second position into a third position by applying a load greater than the threshold to the drop-down shell of the luggage bin against the return force of the spring; wherein the actuation mechanism for measuring the position of the support element relative to the base section has a position measuring mechanism by means of which at least a first position and a second position of the support element relative to the base section can be detected; wherein the first position corresponds to that position of the support element when a load corresponding to the specified threshold acts on the shell; wherein the second position corresponds to the position of the support element if the shell is pivoted by a predefined value from the open position, that is, when unloaded, in the direction of the closed position; and wherein the position measuring mechanism has a control connection with the electromagnet by means of a control system having a master clock such that the actuation element is positioned against the actuation point of the toggle when the position measuring device detects initially the first position and then the second position within a predefined time window.

* * * * *

UNITED STATES PATENT AND TRADEMARK OFFICE
CERTIFICATE OF CORRECTION

| | | |
|---|---|---|
| PATENT NO. | : 9,205,924 B2 | Page 1 of 1 |
| APPLICATION NO. | : 14/193571 | |
| DATED | : December 8, 2015 | |
| INVENTOR(S) | : Johannes Geng | |

It is certified that error appears in the above-identified patent and that said Letters Patent is hereby corrected as shown below:

Title Page of the Patent, Column 1, Item (73) Assignee, Line 1, delete "Generale" and insert -- General --

Claims

Column 9, Line 57, Claim 2, delete "leas" and insert -- legs --

Column 10, Line 47, Claim 9, delete "of the of the" and insert -- of the --

Column 10, Line 49, Claim 10, delete "to one of" and insert -- to --

Signed and Sealed this
Twenty-sixth Day of April, 2016

Michelle K. Lee
*Director of the United States Patent and Trademark Office*